(12) United States Patent
Ma et al.

(10) Patent No.: US 10,990,211 B2
(45) Date of Patent: Apr. 27, 2021

(54) TOUCH CONTROL DISPLAY SCREEN AND MANUFACTURING METHOD THEREFOR, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Weijie Ma, Beijing (CN); Haifeng Hu, Beijing (CN); Jun Li, Beijing (CN); Qicheng Chen, Beijing (CN); Xianlin Ding, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/639,347

(22) PCT Filed: Mar. 26, 2019

(86) PCT No.: PCT/CN2019/079679
§ 371 (c)(1),
(2) Date: Feb. 14, 2020

(87) PCT Pub. No.: WO2019/184910
PCT Pub. Date: Oct. 3, 2019

(65) Prior Publication Data
US 2021/0026475 A1    Jan. 28, 2021

(30) Foreign Application Priority Data

Mar. 26, 2018    (CN) .......................... 201810252300.7

(51) Int. Cl.
*G06F 3/041*    (2006.01)
*G02F 1/1335*    (2006.01)
*G06F 3/044*    (2006.01)

(52) U.S. Cl.
CPC ...... *G06F 3/0412* (2013.01); *G02F 1/133512* (2013.01); *G02F 1/133531* (2021.01);
(Continued)

(58) Field of Classification Search
CPC .. G06F 3/0412; G06F 3/0443; G02F 1/13338; G02F 1/133528–133541; G02F 1/133514; H01L 27/323
See application file for complete search history.

(56) References Cited

U.S. PATENT DOCUMENTS

| 9,978,304 B2 * | 5/2018 | Liu .................. G06F 3/0445 |
| 2013/0070180 A1 * | 3/2013 | Kuriyama ............ G02F 1/1335 349/58 |

(Continued)

FOREIGN PATENT DOCUMENTS

| CN | 103682154 A | 3/2014 |
| CN | 105389049 A | 3/2016 |

(Continued)

OTHER PUBLICATIONS

Mar. 10, 2020—(CN) First Office Action Appn 201810252300.7 with English Translation.

*Primary Examiner* — Sanjiv D. Patel
(74) *Attorney, Agent, or Firm* — Banner & Witcoff, Ltd.

(57) ABSTRACT

A touch display screen, a manufacturing method thereof, and a display device are disclosed. The touch display screen includes a display panel; a touch layer on the display panel; and an optical film, on a side of the touch layer away from the display panel, the optical film and the display panel are in direct contact with each other.

18 Claims, 3 Drawing Sheets

(52) U.S. Cl.
CPC .. *G06F 3/0443* (2019.05); *G06F 2203/04102* (2013.01); *G06F 2203/04103* (2013.01); *G06F 2203/04111* (2013.01)

(56) References Cited

U.S. PATENT DOCUMENTS

2015/0130736 A1* 5/2015 Liu ..................... G06F 3/0446
                                                    345/173
2017/0133436 A1* 5/2017 Wang .................. H01L 51/5246
2019/0162991 A1* 5/2019 Hagiwara ........... G02F 1/13737

FOREIGN PATENT DOCUMENTS

| CN | 105655501 A | 6/2016 |
| CN | 205563518 U | 9/2016 |
| CN | 206209667 U | 5/2017 |
| CN | 108415626 A | 8/2018 |

\* cited by examiner

… (1)

TOUCH CONTROL DISPLAY SCREEN AND MANUFACTURING METHOD THEREFOR, AND DISPLAY DEVICE

CROSS-REFERENCE OF RELATED APPLICATION

The application is a U.S. National Phase Entry of International Application No. PCT/CN2019/079679 filed on Mar. 26, 2019, designating the United States of America and claiming priority to Chinese Patent Application No. 201810252300.7 filed on Mar. 26, 2018. The present application claims priority to and the benefit of the above-identified applications and the above-identified applications are incorporated by reference herein in their entirety.

TECHNICAL FIELD

Embodiments of the present disclosure relate to a manufacturing method of a touch display screen, a touch display screen and a display device.

BACKGROUND

With the rapid development of touch technology, touch display screens are gradually applied to electronic products. A design direction of the touch display screens is to make the touch display screens become more and more thinner, for example, to reduce the thickness of a flexible touch display screen, which is more conducive to the flexibly folding of the flexible touch display screen.

SUMMARY

Embodiments of the present disclosure relate to a manufacturing method of a touch display screen, a touch display screen and a display device.

In one aspect, at least one embodiment of the present disclosure provides a touch display screen, and the touch display screen comprises a display panel, a touch layer on the display panel, and an optical film on a side of the touch layer away from the display panel; the optical film and the display panel are in direct contact with each other.

In another aspect, at least one embodiment of the present disclosure provides a display device, and the display device comprises the touch display screen mentioned above.

In still another aspect, at least one embodiment of the present disclosure provides a manufacturing method of a touch display screen, and the manufacturing method comprises: providing a display panel, forming a touch layer on the display panel, and forming an optical film on a side of the touch layer away from the display panel; and the optical film and the display panel are in direct contact with each other.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
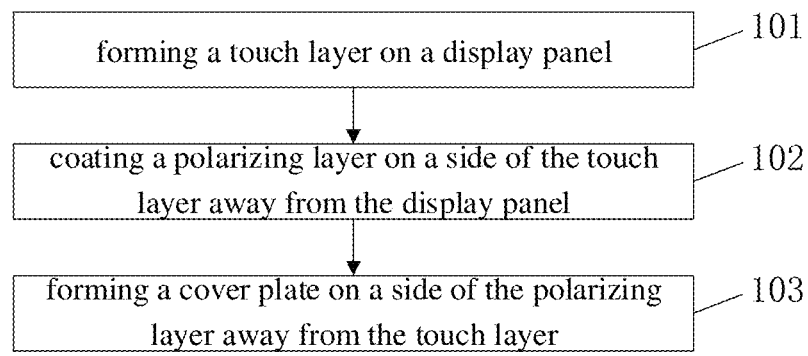
FIG. 1 is a flowchart of a manufacturing method of a touch display screen provided by an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect. The terms "on," "under," "right," "left" and the like are only used to indicate relative position relationship, and in a case that the position of an object is described as being changed, the relative position relationship may be changed accordingly.

At present, in the manufacturing process of a touch display screen, an optical film and a touch layer are usually bonded with each other by using an optically clear adhesive (OCA). However, the thickness of the OCA is relatively large. For example, the thickness of the OCA is larger than a thickness of the touch layer and is larger than a thickness of the optical film, which is not good in thinning the touch display.

According to an embodiment of the present disclosure, a touch display screen is provided, and the touch display screen comprises: a display panel, a touch layer on the display panel, and an optical film on a side of the touch layer away from the display panel; the optical film and the display panel are in direct contact with each other.

Because a polarizing layer is directly formed on the touch layer, there is no need to use the OCA to bond the polarizing layer and the touch layer together, so that the thickness of the touch display screen is reduced. In a case that the touch display screen is used as a flexible touch display screen, the thickness of the flexible touch display screen is reduced, which is more conducive to the flexible folding of the flexible touch display screen.

In at least some embodiments, no adhesive layer is provided between the optical film and the touch layer. Because an OCA layer is omitted, the touch display screen is lighter and thinner, which is more conducive to the folding of the flexible touch display screen.

In at least some embodiments, the touch display screen further comprises a cover plate, the cover plate is on a side of the optical film away from the display panel, and the cover plate and the optical film are in direct contact with each other. In at least some embodiments, no adhesive layer is provided between the cover plate and the optical film. In this way, the cover plate and the optical film do not need to be bonded together through any adhesive layer, which further reduces the thickness of the touch display screen, and it is more conducive to the flexible folding of the flexible touch display screen.

In at least some embodiments, the touch display screen further comprises a light shielding layer, and the light shielding layer surrounds the optical film. In this way, the light shielding layer prevents IC circuits located under the optical film from being viewed, and the display effect of the display panel is increased.

In at least some embodiments, the light shielding layer extends continuously along a peripheral edge of the optical film. In this way, it can shield wires at the edges of the optical film and prevent the wires from being viewed after the cover plate is formed.

In at least some embodiments, the touch layer comprises a first bonding region; and the optical film comprises a second bonding region overlapping the first bonding region. Herein, "overlap" refers to partly overlap or completely overlap. In the present disclosure, "overlap" refers to that an orthographic projection of the first bonding region on the display panel overlaps an orthographic projection of the second bonding region on the display panel, so that it is convenient to arrange various circuits or flexible printed circuit (FPC) in the two bonding regions.

In at least some embodiments, the touch display screen is a flexible touch display screen.

The following describes the configuration of the touch display screen in more detail by specific examples.

Figure 3:
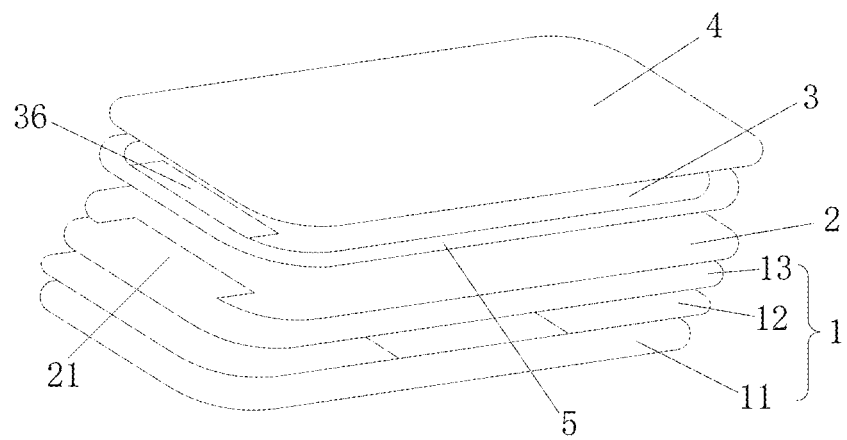
FIG. 3 is a schematically structural diagram of a touch display screen provided by an embodiment of the present disclosure.

As illustrated in FIG. 3, an embodiment of the present disclosure provides a touch display screen, and the touch display screen includes: a display panel 1 and a touch layer 2 disposed on the display panel 1; an optical film, for example a polarizing layer 3, the polarizing layer 3 being disposed on a side of the touch layer 2 away from the display panel 1; a cover plate 4, the cover plate 4 being disposed on a side of the polarizing layer 3 away from the touch layer 2.

The embodiment of the present disclosure adopts an on-cell structural design scheme to integrate the display panel 1 and the touch layer 2. For example, the display panel 1 includes a liquid crystal display panel, an organic light emitting display panel, or other types of display panels, which is not limited herein. A specific structure of the touch layer 2 is also not limited in the embodiment of the present disclosure, and the touch layer 2 includes the structures such as a plurality of touch electrodes and sensing wires, as long as the touch function can be achieved.

The cover plate 4 is the topmost layer of the touch display screen. For example, in a case of manufacturing a flexible touch display screen, the cover plate 4 is a flexible cover plate. For example, a material of the cover plate is a bendable polymer material, and the material of the cover plate is required to have properties such as high hardness, high light-transmittance, high-temperature resistance and high-humidity resistance. For example, the methods for forming the cover plate 4 on the polarizing layer 3 includes an OCA bonding method as in the prior art, or a coating method. Forming the cover plate 4 on the polarizing layer 3 by using the coating method can eliminate the need for the bonding layer which is a relatively thicker layer formed by the OCA, so that the thickness of the touch display screen is reduced.

In the touch display screen provided by the embodiments of the present disclosure, a touch layer is provided on the display panel of the touch display screen, a polarizing layer is coated on a side of the touch layer away from the display panel, and a cover plate is disposed on a side of the polarizing layer away from the touch layer, and the polarizing layer is formed directly on the touch layer by the coating method. Compared with the OCA bonding method, the bonding layer having a thicker thickness formed by the OCA is omitted, so that the thickness of the touch display screen is reduced. Taking the flexible touch display screen as an example, a flexible touch layer is disposed on a flexible display panel, a polarizing layer is coated on the flexible touch layer, and a flexible cover plate is disposed on the polarizing layer. The polarizing layer directly formed on the flexible touch layer by using the coating method reduces the thickness of the flexible touch display screen, which is more conducive to the flexible folding of the flexible touch display screen.

Figure 4:
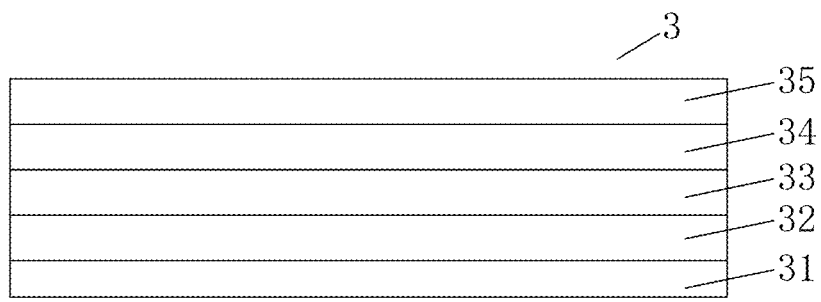
FIG. 4 is a schematically structural diagram of a polarizing layer provided by an embodiment of the present disclosure.

For example, as illustrated in FIG. 4, the polarizing layer 3 includes a polarizer 31, a first pressure sensitive adhesive 32, a phase-difference film 33, a protective film 34, and a second pressure sensitive adhesive 35, all of which are sequentially formed by using the coating method. Compared with FIG. 3, the polarizer 31 is coated on a side of the touch layer 2 away from the display panel 1. A pressure sensitive adhesive (PSA) is a type of adhesive sensitive to pressure. A material of the phase-difference film is an acrylic polymer. The protective film 34, for example, is a Tri-Cellulose Acetate film (TAC), and the protective film 34 is mainly used for protecting the polarizing layer 3. The polarizer 31, the first pressure sensitive adhesive 32, the phase-difference film 33, the protective film 34, and the second pressure sensitive adhesive 35 are sequentially coated on the touch layer 2, such that the polarizing layer 3 is completely coated on the touch layer 2. It should be noted that, for coating each layer of the polymer material, each layer of the polymer material required to be cured by heating and ultraviolet (UV) irradiating.

For example, the cover plate 4 is disposed on a side of the polarizing layer 3 away from the touch layer 2 by using the coating method. The cover plate 4 is coated on the polarizing layer 3 to integrate the display panel 1, the touch layer 2, the polarizing layer 3 and the cover plate 4. Compared with the prior art that the OCA is used to bond the cover plate and the polarizing layer, the bonding layer having a thicker thickness and formed by the OCA is omitted, and the thickness of the touch display screen is reduced. In a case of manufacturing the flexible touch display screen, the cover plate is a flexible cover plate, the material of the cover plate is a bendable polymer material, and the material of the cover plate is required to have properties such as high hardness, high light-transmittance, high-temperature resistance and high-humidity resistance.

For example, the cover plate 4 is made of a continuous phase filled polyimide material with a silicon mesh structure, in this way, the material of the cover plate can be better coated on the polarizing layer 3.

For example, the touch layer 2 is provided with a first bonding region, for example a first opening 21; the polarizing layer 3 is provided with a second bonding region, for example, a second opening 36 overlapping the first opening 21. The first opening 21 is communicated with the second opening 36, and wires on the touch layer 2 are allowed to be led out from the first opening 21 and the second opening 36. In this way, the electrical connection between the led wires on the touch layer 2 and the external circuit board can be performed after the touch display screen is formed, so that the mass production of the touch display screen can be achieved. Compared with the prior art that the wires connection are performed during the process of manufacturing the touch display screen, which renders the touch display screen is produced one by one, the embodiment of the present disclosure provided with the first opening 21 and the second opening 36 can realize a large scale mass production of the touch display screens, thereby increasing the production efficiency.

For example, a light shielding layer 5 is disposed on an outer peripheral edge of the polarizing layer 3. The light shielding layer 5 is used for shielding the wires at the edge of the touch layer 2 so as to prevent the wires from being viewed after the cover plate 4 is formed.

For example, the display panel 1 includes a base substrate 11, an organic layer 12, and an encapsulation layer 13 arranged in sequence, and the touch layer 2 is disposed on a side of the encapsulation layer 13 away from the organic layer 12. The touch layer 2 can sense the touch position based on a mutual capacitance principle or a self-capacitance principle, so that the touch layer 2 may be a bridge structure or a single layer structure. The embodiment of the present disclosure adopts an on-cell structural design scheme, for example, the touch layer 2 has a vanishing layer.

In the touch display screen provided by the embodiment of the present disclosure, the touch layer is disposed on the display panel, and the first opening is provided in the touch layer. The polarizing layer is coated on a side of the touch layer away from the display panel, and the second opening overlapping the first opening is provided in the polarizing layer. The first opening overlaps the second opening. The light shielding layer is formed on the outer peripheral edge of the polarizing layer, and the light shielding layer is used for shielding the wires at the edge of the touch layer. The cover plate is formed on the side of the polarizing layer away from the touch layer. The polarizing layer is formed directly on the touch layer by using the coating method. Compared with the OCA bonding method, the bonding layer having a thicker thickness and formed by the OCA is omitted, so that the thickness of the touch display screen is reduced. Taking the flexible touch display screen as an example, a flexible touch layer is disposed on a flexible display panel, a polarizing layer is coated directly on the flexible touch layer, and a flexible cover plate is formed on the polarizing layer. The polarizing layer directly formed on the flexible touch layer by using the coating method reduces the thickness of the flexible touch display screen, which is more conducive to the flexible folding of the flexible touch display screen. The first opening 21 and the second opening 36 are used for leading the wires out, which is convenient for the electrical connection between the wires lead out and the external circuit board, so as to realize that the electrical connection between the wires on the touch layer and the external circuit board after the touch display screen is formed, and to realize a large-scale mass production of the touch display screens, thereby increasing the production efficiency.

The embodiment of the present disclosure provides a display device, and the display device comprises the touch display screen mentioned above. The structure and principle of the touch display screen are the same as those in the above embodiments, which are omitted herein. Because the display device has the above-mentioned touch display screen, it has at least the advantages of the above-mentioned touch display screen, which are omitted herein.

Figure 5:
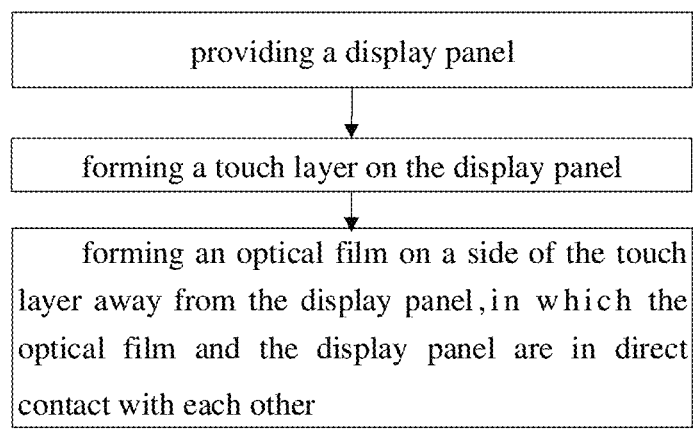
FIG. 5 is a flowchart of a manufacturing method of a touch display screen provided by still another embodiment of the present disclosure.

According to an embodiment of the present disclosure, a manufacturing method of a touch display screen is provided, with reference to FIG. 5, the manufacturing method comprises: providing a display panel, forming a touch layer on the display panel, and forming an optical film on a side of the touch layer away from the display panel; and the optical film and the display panel are in direct contact with each other.

Compared with the prior art that the OCA is used to bond the cover plate with the optical film, the thickness of the touch display screen in the embodiment is reduced because the OCA is omitted. In a case that the method is used for manufacturing the flexible touch display screen, the thickness of the flexible touch display screen is reduced, which is more conducive to the flexible folding of the flexible touch display screen. The following describes the manufacturing method of the touch display screen by more specific embodiments.

The manufacturing method of the touch display screen in the present embodiment has the structure and advantages of the above-mentioned touch display screen, which are omitted herein. The following describes the manufacturing method of the touch display screen by more specific examples.

As illustrated in FIG. 1, an embodiment of the present disclosure provides a manufacturing method of a touch display screen, and the manufacturing method comprises the following steps.

101: forming a touch layer on a display panel.

For example, the embodiment of the present disclosure adopts the on-cell structural design scheme to integrate the display panel and the touch layer. The display panel includes a liquid crystal display panel, an organic light emitting display panel, or other types of display panels, which is not limited herein. A specific structure of the touch layer is also not limited in the embodiment of the present disclosure, for example, the touch layer includes a plurality of touch electrodes, it can be contemplated that the touch layer can also have other structures, as long as it can realize the touch function.

102: coating a polarizing layer on a side of the touch layer away from the display panel.

Figure 6:
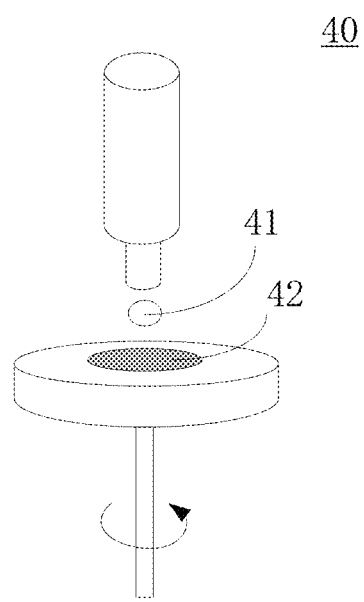
FIG. 6 is a schematic diagram of a coating method provided by an embodiment of the present disclosure.

Compared with the OCA bonding method, the coating method, which is used for forming the polarizing layer directly on the touch layer, makes that the bonding layer having a thicker thickness and formed by the OCA is omitted, so that the thickness of the touch display screen is reduced. In a case that the manufacturing method is used for manufacturing the flexible touch display screen, the thickness of the flexible touch display screen is reduced, which is more conducive to the flexible folding of the flexible touch display screen. For example, the coating method is a chemical coating method. As illustrated in FIG. 6, the liquid material 41 is spin coated on a base film by a spin coater 40. It can be contemplated in the art that in a case that the polarizing layer is directly coated on the touch layer, the liquid material 41 represents a material for forming the polarizing layer, and the base film, for example, is a touch layer. In a case that the cover plate is directly coated on the polarizing layer, the liquid material 41 represents a material for forming the cover plate, and the base film, for example, is the polarizing layer.

103: forming a cover plate on a side of the polarizing layer away from the touch layer.

The cover plate is the topmost layer of the touch display screen. For example, in a case of manufacturing a flexible touch display screen, the cover plate is a flexible cover plate. For example, a material of the cover plate is a bendable polymer material, and the material of the cover plate is required to have properties such as high hardness, high light-transmittance, high-temperature resistance and high-humidity resistance. For example, the methods for forming the cover plate on the polarizing layer includes an OCA bonding method, or a coating method. For example, forming the cover plate on the polarizing layer by using the coating method eliminates the need for the bonding layer, which has a thicker thickness and is formed by the OCA, so that the thickness of the touch display screen is reduced.

The embodiment of the present disclosure provides a manufacturing method of a touch display screen, and the manufacturing method comprises: forming a touch layer on a display panel, then coating a polarizing layer on a side of the touch layer away from the display panel, and finally forming a cover plate on a side of the polarizing layer away from the touch layer. In the manufacturing method, the polarizing layer is formed directly on the touch layer by using the coating method. Compared with the OCA bonding method, the bonding layer having a thicker thickness formed by the OCA is omitted, so that the thickness of the touch display screen is reduced. Taking the flexible touch display screen as an example, a flexible touch layer is formed on a flexible display panel, a polarizing layer is coated on the flexible touch layer, and a flexible cover plate is formed on the polarizing layer. The polarizing layer directly formed on the flexible touch layer by using the coating method reduces the thickness of the flexible touch display screen, which is more conducive to the flexible folding of the flexible touch display screen.

Figure 2:
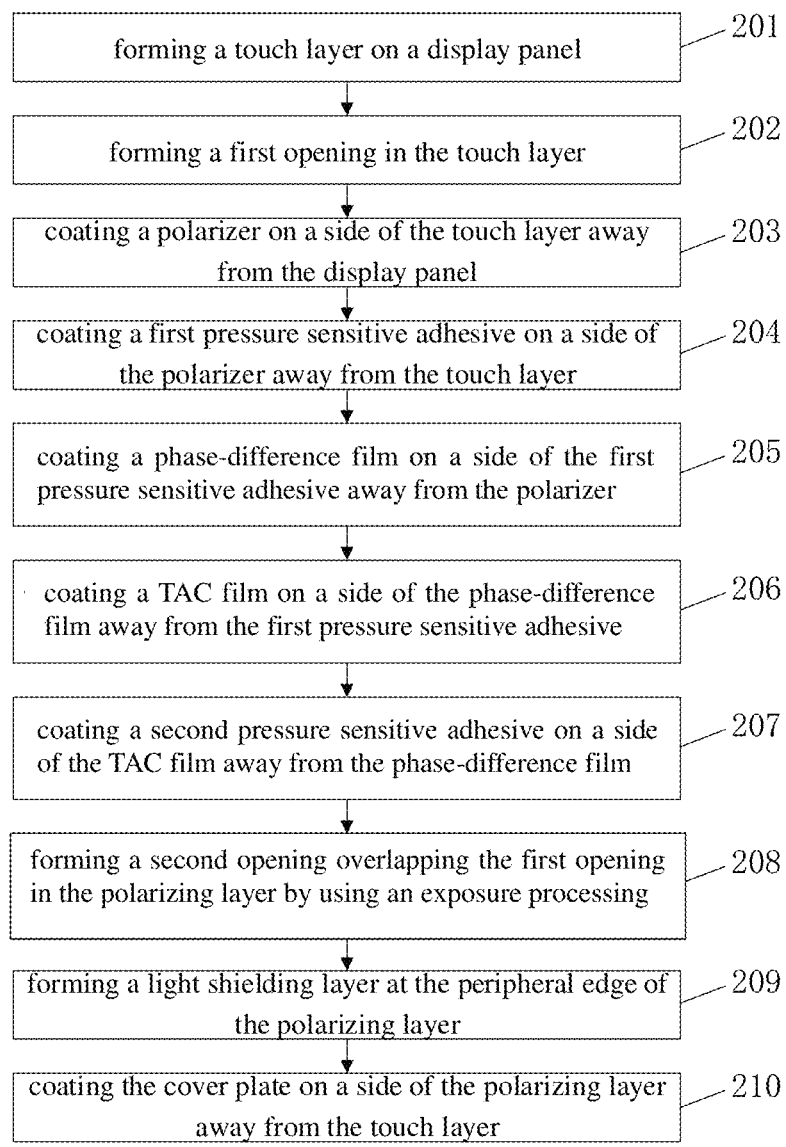
FIG. 2 is a flowchart of a manufacturing method of a touch display screen provided by another embodiment of the present disclosure.

As illustrated in FIG. 2, another embodiment of the present disclosure provides a manufacturing method of a touch display screen, and the manufacturing method comprises the following steps.

201: forming a touch layer on a display panel.

Detailed descriptions of step 201 may refer to the corresponding descriptions in step 101 in FIG. 1, which are omitted herein.

For example, the display panel includes a base substrate, an organic layer, and an encapsulation layer arranged in sequence. An on-cell structural design scheme is adopted, and the touch layer is formed on a side of the encapsulation layer away from the organic layer. The touch layer may have a bridge structure or a single layer structure, and the touch layer usually has a vanishing layer.

202: forming a first opening in the touch layer.

The first opening is used for leading out the wires on the touch layer from the first opening, which is convenient to electrically connect the wires with the external circuit board. The first opening is used for leading the wires out, which can realize the electrical connection between the wires lead out and the external circuit board after the touch display screen is formed, so as to achieve a large-scale mass production of the touch display screens. In the situation that no opening structure is provided for leading out the wires, the wires has to be connected with the external circuit board during the process of manufacturing the touch display screen, so the touch display screen is required to be produced one by one. In comparison to the above situation, the embodiment of the present disclosure is provided with the first opening to realize a large-scale mass production of the touch display screens, thereby increasing the production efficiency.

203: coating a polarizer on a side of the touch layer away from the display panel.

204: coating a first pressure sensitive adhesive on a side of the polarizer away from the touch layer.

205: coating a phase-difference film on a side of the first pressure sensitive adhesive away from the polarizer.

206: coating a TAC film on a side of the phase-difference film away from the first pressure sensitive adhesive.

207: coating a second pressure sensitive adhesive on a side of the TAC film away from the phase-difference film.

Step 203 to step 207 are the specific steps of coating the polarizing layer on the touch layer, and the pressure sensitive adhesive (PSA) is a kind of adhesive sensitive to pressure. The material of the phase-difference film is acrylic polymer; and the TAC film is mainly used for protecting the polarizing layer.

It should be noted that, the film formed of the polymer material needs to be cured by heating or UV (Ultra-Violet) irradiating after it is coated in step 203 to step 207.

208: forming a second opening overlapping the first opening in the polarizing layer by using an exposure processing.

For example, the second opening overlaps the first opening provided in step 202, the second opening communicates with the first opening, and the second opening plays a same role as the first opening. Both the first opening and the second opening are used for leading the wires out, which is convenient for the electrical connection between the wires lead out and the external circuit board, so as to realize that the electrical connection between the wires on the touch layer and the external circuit board after the touch display screen is formed, and to realize a large-scale mass production of the touch display screens, thereby increasing the production efficiency.

209: forming a light shielding layer at the peripheral edge of the polarizing layer.

For example, the light shielding layer is used for shielding the wires at the edge of the touch layer so as to prevent the wires from being viewed after the cover plate is formed.

210: coating the cover plate on a side of the polarizing layer away from the touch layer.

For example, the cover plate is coated on the polarizing layer to integrate the display panel, the touch layer, the polarizing layer and the cover plate. Compared with the bonding method in the prior art that the OCA is used, the bonding layer having a thicker thickness and formed by the OCA is omitted, thus the thickness of the touch display screen is reduced. In a case of manufacturing the flexible touch display screen, the cover plate is a flexible cover plate, and the material of the cover plate is a bendable polymer material, and the material of the cover plate is required to have properties such as high light-transmittance, high-temperature resistance and high-humidity resistance.

For example, the cover plate is made of a continuous phase filled polyimide material with a silicon mesh structure, in this way, the material of the cover plate can be better coated on the polarizing layer.

In the manufacturing method of the touch display screen provided by the embodiment of the present disclosure, the touch layer is formed on the display panel, the first opening is provided in the touch layer, then the polarizing layer is coated on a side of the touch layer away from the display panel; the second opening overlapping the first opening is provided in the polarizing layer, and the first opening is in communication with the second opening. Next, the light shielding layer is formed on the outer peripheral edge of the polarizing layer, and the light shielding layer is used for shielding the wires at the edge of the touch layer. Finally, the cover plate is formed on the side of the polarizing layer away from the touch layer. The polarizing layer is formed directly on the touch layer by using the coating method. Compared with the OCA bonding method, the bonding layer having a thicker thickness and formed by the OCA is omitted, so that the thickness of the touch display screen is reduced. Taking the flexible touch display screen as an example, a flexible touch layer is disposed on a flexible display panel, a polarizing layer is coated on the flexible touch layer, and a flexible cover plate is formed on the polarizing layer. The polarizing layer is directly formed on the flexible touch layer by using the coating method, which reduces the thickness of the flexible touch display screen and is more conducive to the flexible folding of the flexible touch display screen. The first opening and the second opening are used for leading out the wires to achieve the electrical connection between the wires lead out and the external circuit board, so as to realize that the electrical connection between the wires on the touch layer and the external circuit board after the touch display screen is formed, and to realize a large-scale mass production of the touch display screens, thereby increasing the production efficiency.

In the article, the following points required to be explained:

(1) the drawings of the embodiments of the present disclosure only relate to the structures related to the embodiments of the present disclosure, and other structures can refer to the general design.

(2) for the sake of clarity, in the drawings used to describe the embodiments of the present disclosure, the thickness of layers or areas is enlarged or reduced, that is, the drawings are not drawn according to the actual scale.

(3) without conflict, the embodiments of the present disclosure and the features in the embodiments may be combined with each other to obtain new embodiments.

What is described above is related to the illustrative embodiments of the disclosure only and not limitative to the scope of the disclosure; the scopes of the disclosure are defined by the accompanying claims.

What is claimed is:

1. A touch display screen, comprising:
    a display panel;
    a touch layer on the display panel; and
    an optical film, on a side of the touch layer away from the display panel,
    wherein the touch layer comprises a first bonding region, the optical film comprises a second bonding region,
    wherein the first bonding region comprises a first opening, the second bonding region comprises a second opening, and
    wherein the first opening communicates with the second opening, and wires on the touch layer are configured to be led out from the first opening and the second opening, so as to realize an electrical connection between the wires on the touch layer and an external circuit board.

2. The touch display screen according to claim 1, wherein no adhesive layer is provided between the optical film and the touch layer.

3. The touch display screen according to claim 1, further comprising a cover plate, wherein the cover plate is on a side of the optical film away from the display panel, and the cover plate and the optical film are in direct contact with each other.

4. The touch display screen according to claim 3, wherein no adhesive layer is provided between the cover plate and the optical film.

5. The touch display screen according to claim 1, further comprising a light shielding layer, wherein the light shielding layer surrounds the optical film.

6. The touch display screen according to claim 5, wherein the light shielding layer extends continuously along a peripheral edge of the optical film.

7. The touch display screen according to claim 1, wherein the second bonding region overlaps the first bonding region.

8. The touch display screen according to claim 1, wherein the touch display screen is a flexible touch display screen.

9. A display device, comprising the touch display screen according to claim 1.

10. A manufacturing method of a touch display screen, comprising:
    providing a display panel;
    forming a touch layer on the display panel; and
    forming an optical film on a side of the touch layer away from the display panel,
    wherein the touch layer comprises a first bonding region, the optical film comprises a second bonding region,
    wherein the first bonding region comprises a first opening, the second bonding region comprises a second opening, and
    wherein the first opening communicates with the second opening, and wires on the touch layer are configured to be led out from the first opening and the second opening, so as to realize an electrical connection between the wires on the touch layer and an external circuit board.

11. The manufacturing method according to claim 10, wherein no adhesive layer is provided between the optical film and the touch layer.

12. The manufacturing method according to claim 10, further comprising: forming a cover plate on a side of the optical film away from the display panel, wherein the cover plate and the optical film are in direct contact with each other.

13. The manufacturing method according to claim 12, wherein no adhesive layer is provided between the cover plate and the optical film.

14. The manufacturing method according to claim 10, further comprising:
    forming a light shielding layer, wherein the light shielding layer surrounds the optical film.

15. The manufacturing method according to claim 14, wherein the light shielding layer extends continuously along a peripheral edge of the optical film.

16. The manufacturing method according to claim 10, wherein the second bonding region overlaps the first bonding region.

17. The manufacturing method according to claim 10, wherein the optical film is formed by coating a liquid on the touch layer.

18. The manufacturing method according to claim 12, wherein the cover plate is formed by coating a liquid on the optical film.

* * * * *